United States Patent [19]

Ross et al.

[11] 4,015,857
[45] Apr. 5, 1977

[54] VEHICLE TRAILER HITCH

[76] Inventors: Anthony J. Ross, 526 - 74th St.;
James A. Ross, 528 - 74th St., both of Holmes Beach, Fla. 33510

[22] Filed: Feb. 11, 1976

[21] Appl. No.: 657,163

[52] U.S. Cl. ............................................. 280/495
[51] Int. Cl.² ........................................ B60D 1/14
[58] Field of Search ................. 280/495, 496, 497

[56] References Cited
UNITED STATES PATENTS

| | | | |
|---|---|---|---|
| 2,978,260 | 4/1961 | Hebeisen | 280/495 |
| 3,463,513 | 8/1969 | Burton | 280/495 |
| 3,463,514 | 8/1969 | Warner | 280/495 |
| 3,838,872 | 10/1974 | Fullhart | 280/495 |

Primary Examiner—Robert R. Song
Attorney, Agent, or Firm—Morsbach & Pillote

[57] ABSTRACT

A trailer hitch particularly for recreational vehicles of the type having a rear cross frame member, a vehicle bumper spaced rearwardly from the cross frame member and a holding tank dump tube with its outlet at a location intermediate the ends of the rear cross frame member. The trailer hitch has mounting plates attached to the rear frame member at opposite sides of the dump tube outlet and the trailer hitch has a generally U-shaped bracket that extends downwardly and rearwardly from the mounting plates to a level below the vehicle bumper and a panel member that extends rearwardly from the U-shaped hitch bracket with trailer coupling means at the rear end thereof.

4 Claims, 3 Drawing Figures

U.S. Patent    April 5, 1977    4,015,857

VEHICLE TRAILER HITCH

BACKGROUND OF THE INVENTION

It is presently common practice to manufacture motor vehicles with shock absorbing type front and rear bumpers. Trailer hitches cannot properly be connected to such shock absorbing bumpers, and it is therefore necessary to attach the trailer hitch to the frame of the vehicle. However, some recreational type vehicles have the outlet end of the holding tank dump tube positioned intermediate the rear cross frame member and the rear vehicle bumper, and it is necessary to maintain access to the holding tank dump tube.

SUMMARY OF THE INVENTION

The present invention relates to a trailer hitch particularly adapted for use on recreational type vehicles having the holding tank dump tube outlet located intermediate the rear cross frame member and the rear vehicle bumper.

An important object of this invention is to provide a trailer hitch for recreational vehicles of the type described and which is adapted for mounting directly on the vehicle frame and which yet provides clear access to the dump tube outlet and avoids interference with the vehicle bumper.

Figure 1:
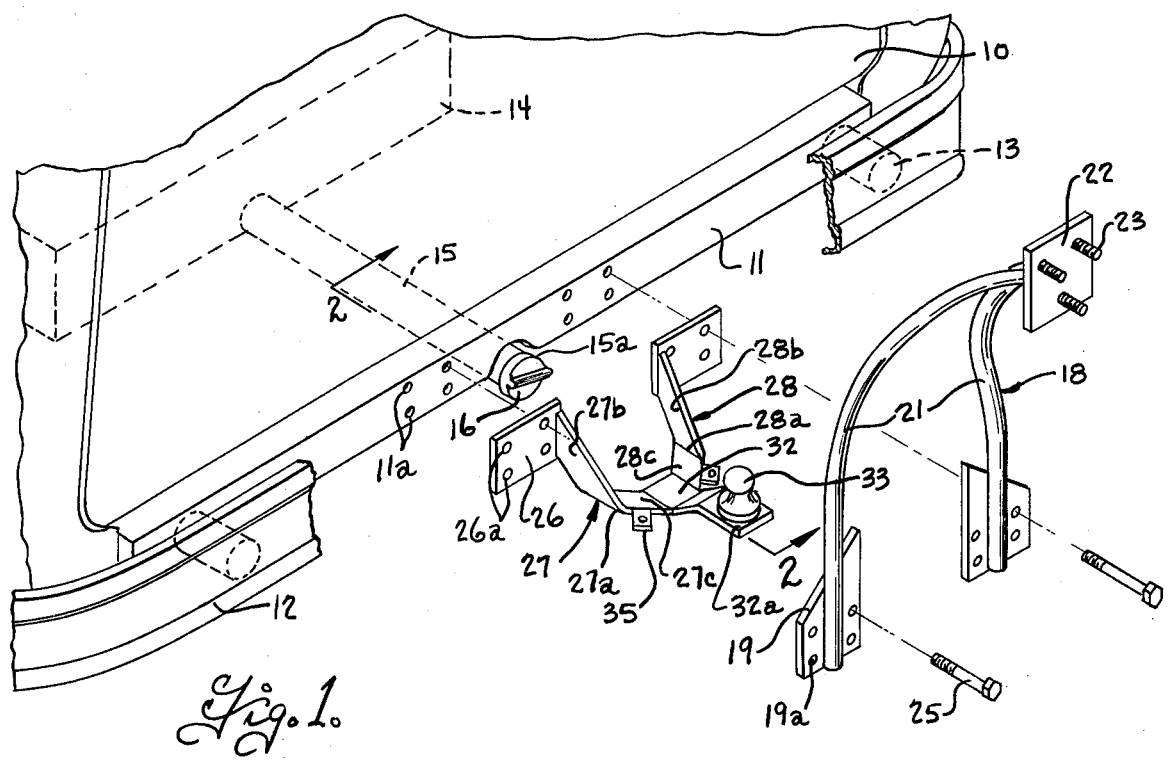
Figure 2:
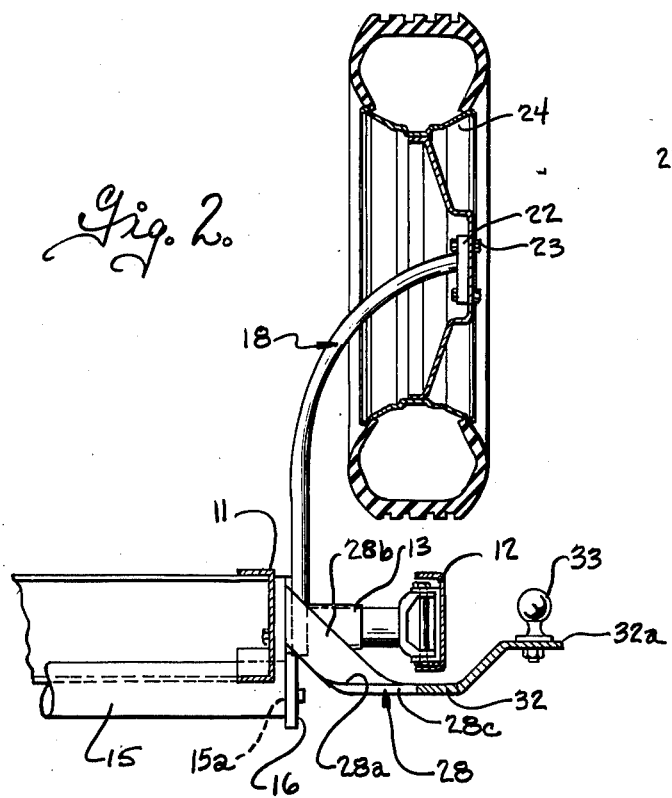
Figure 3:
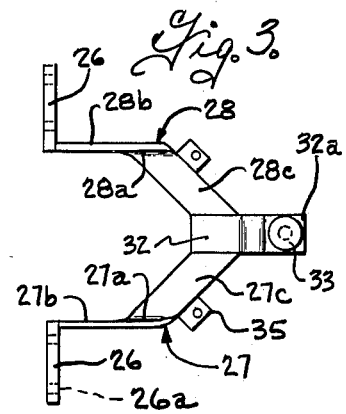

Another object of this invention is to provide a trailer hitch which can be economically fabricated and which is strong and reliable in use. These, together with other objects and advantages of this invention will be more readily understood by reference to the following detailed description when taken in connection with the accompanying drawings wherein:

FIG. 1 is a fragmentary exploded perspective view showing attachment of the trailer hitch to the rear portion of the recreational type vehicle;

FIG. 2 is a fragmentary vertical sectional view through the vehicle and trailer hitch; and FIG. 3 is a plan view of the trailer hitch. The trailer hitch of the present invention is particularly adapted for use on a recreational vehicle and of the type currently being marketed by the General Motors Corporation under the name "MotorHome". The vehicle frame in such recreational type vehicles includes a rear cross frame member 11 having a rear bumper 12 mounted thereon by shock absorbing bumper suspensions 13. The rear bumper 12 is spaced rearwardly from the rear cross frame member 11 and the vehicle has a waste water holding tank 14 connected through a dump tube 15 that extends rearwardly and terminates in a dump tube outlet 15a approximately medially between the ends of the rear cross frame member 11 and intermediate the rear cross frame member and bumper. A cap 16 is removably attached to the dump tube outlet to enable selective discharge of the contents of the waste water holding tank. The aforementioned recreational vehicle also has a spare tire mounting bracket 18 attached to the rear cross frame member and, as shown, includes a pair of spaced mounting plates 19, upwardly and rearwardly extending bracket members 21 and a spare tire mounting pad 22 at the upper end of the brackets 21. The spare tire 24 is adaptedly mounted as by bolts 23 on the mounting pad, as best shown in FIG. 2. The mounting plates of the spare tire mounting bracket are detachably secured to the rear cross frame member by bolts 25 that extend through openings 19a in the mounting plates 19 and through openings 11a in the rear cross frame member 11 at relatively opposite sides of the dump tube outlet and, commonly, four such bolts are provided for attaching each of the mounting plates.

The trailer hitch 31 of the present invention is constructed and arranged for mounting directly on the rear cross frame member 11 and in such a manner as to provide clear access for the dump tube outlet and to avoid interference with the shock absorbing bumper 12. The trailer hitch includes a pair of mounting plates 26 which are conveniently provided with four bolt holes 26a in the same pattern as the bolt holes 11a in the rear cross frame member. The trailer hitch is thus conveniently attached to the rear cross frame member by the same bolts utilized to attach the spare tire mounting bracket to the rear cross frame member. The trailer hitch includes a generally U-shaped hitch bracket which is attached to the mounting plate 26 as by welding and which extends downwardly and rearwardly therefrom to a level below the vehicle bumper. The U-shaped hitch bracket is formed by a pair of members 27, 28 of flat bar stock and which are bent intermediate their ends at 27a, 28a at an acute angle to the length of the piece of bar stock to provide first and second bar sections 27b, 27c and 28b, 28c in which the flat faces of the bar stock are in relatively transverse planes. The first bar sections 27b, 28b are rigidly secured at one end to a respective one of the mounting plates 26 with the first sections having the flat faces thereof disposed in a generally upright plane and with the lengthwise axis of the first section extending downwardly and rearwardly at an acute angle, as best shown in FIGS. 1 and 2 to a level below the underside of the bumper 12. In the embodiment shown, the first bar sections extend downwardly and rearwardly from the respective mounting pad at an angel of the order of 45° to the horizontal. The second sections 27c, 28c of the pair of members have the flat faces thereof disposed in a generally horizontal plane and with the lengthwise axes of the sections converging rearwardly as shown in FIGS. 1 and 3 to thereby form the aforementioned U-shaped hitch bracket with the web portion of the brackets faced rearwardly from the dump tube outlet to provide clear access thereto and with the web portion underlying the bumper so as to avoid interference with the movement of the bumper. As best shown in FIG. 2, the bar sections 27c, 28c extend at an angle of about 45°to the longitudinal axis of the vehicle. A tongue member 32 is rigidly secured as by welding to the converging ends of the sections 27c, 28c and the tongue member 32 extends rearwardly and outwardly therefrom with its rear end 32a offset above the plane of the sections 27c, 28c, as best shown in FIG. 2. A trailer coupling member such as a ball member 33 is mounted on the rear end portion of the tongue member 32 for connection to a trailer. Chain eyes 35 are secured to the hitch member at relatively opposite sides of the centerline thereof for receiving safety chains.

From the foregoing it is felt that the construction and installation of the hitch will be readily understood. The hitch can be readily attached to the rear cross frame member of the vehicle using the existing mounting holes 11a in the rear cross frame member and the hitch extends downwardly and rearwardly as shown in FIG. 2 to a level below the bumper and the hitch is faced rearwardly from the holding tank outlet so as to allow free access thereto. Thus, the hitch does not interfere with either the access to the holding tank outlet or to operation of the impact bumper.

The embodiments of the invention in which an exclusive property or privilege is claimed are defined as follows:

1. In a recreational vehicle of the type including a frame having a rear frame cross member, a rear vehicle bumper spaced rearwardly from the rear frame cross member, and a holding tank dump tube having an outlet at a location substantially medially between the ends of the rear frame cross member, a trailer hitch comprising a generally U-shaped hitch bracket having spaced legs and a connecting web and mounting plates secured to the ends of said legs, said mounting plates being disposed in a generally upright plane and attached to said rear frame cross member at relatively opposite sides of the dump tube outlet, the spaced legs being formed of flat bar stock with their major transverse dimensions disposed in a generally upright plane at the point of attachment to the mounting plates and the said legs extending downwardly and rearwardly from the respective mounting plate to a level below the bumper, said web of said U-shaped hitch bracket being formed of two web sections of flat bar stock each integrally joined to a respective one of the legs and said two web sections of flat bar stock having the major transverse axis thereof disposed in a generally horizontal plane with the longitudinal axis of said web sections converging rearwardly at a level below the underside of the rear vehicle bumper whereby to space the web portion of the hitch bracket rearwardly from the dump tube outlet a distance sufficient to provide access thereto, a tongue member attached to the converging ends of the web sections of the hitch bracket and extending rearwardly therefrom, and coupling means on the tongue member for connecting a trailer thereto.

2. The combination of claim 1 wherein said tongue member has the rear end thereof offset upwardly from said web portion of the hitch bracket.

3. A trailer hitch for use on a vehicle having a rear cross frame member and a bumper spaced rearwardly from the rear cross frame member, the tractor hitch comprising a generally U-shaped hitch bracket having spaced mounting plates thereon, said mounting plates being adapted for attachment to the rear cross frame member with the mounting plates disposed in an upright plane, said U-shaped hitch bracket including a pair of members each formed of a piece of flat bar stock bent intermediate its ends at an acute angle to the length of the piece to provide first and second sections with the flat faces thereof in relatively transverse planes, said first sections a said pair of members being rigidly secured at one end to a respective one of the mounting plates with the first sections having the flat faces thereof disposed in a generally upright plane and with the lengthwise axis of the first sections extending downwardly and rearwardly from the respective mounting plate, the second sections of the pair of members having the flat faces thereof disposed in a generally horizontal plane and with the lengthwise axes thereof converging rearwardly, a tongue member rigidly secured to the converging ends of said second sections and extending rearwardly therefrom, and coupling means in the tongue member for connecting a trailer thereto.

4. A trailer hitch according to claim 3 wherein said tongue member has the rear end thereof offset upwardly from the plane of said second sections of said pair of members.

* * * * *

UNITED STATES PATENT AND TRADEMARK OFFICE
CERTIFICATE OF CORRECTION

PATENT NO. : 4,015,857
DATED : April 5, 1977
INVENTOR(S) : Anthony J. Ross and James A. Ross It is certified that error appears in the above-identified patent and that said Letters Patent are hereby corrected as shown below:

Column 4, line 7, change "tractor" to -- trailer --.

Signed and Sealed this fifth Day of July 1977

[SEAL]

Attest:

RUTH C. MASON
*Attesting Officer*

C. MARSHALL DANN
*Commissioner of Patents and Trademarks*